US009392563B2

(12) United States Patent
Guo et al.

(10) Patent No.: US 9,392,563 B2
(45) Date of Patent: Jul. 12, 2016

(54) FREQUENCY SYNCHRONIZATION METHOD FOR NODES IN A DOWNLINK COORDINATED MULTIPLE POINT TRANSMISSION SCENARIO (75) Inventors: Zhiheng Guo, Beijing (CN); Shaohua Li, Beijing (CN); Jinhua Liu, Beijing (CN); Zhan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 24 days.

(21) Appl. No.: 14/372,680

(22) PCT Filed: Jul. 16, 2012

(86) PCT No.: PCT/CN2012/078677
§ 371 (c)(1),
(2), (4) Date: Jul. 16, 2014

(87) PCT Pub. No.: WO2013/110226
PCT Pub. Date: Aug. 1, 2013

(65) Prior Publication Data
US 2014/0369243 A1 Dec. 18, 2014

(30) Foreign Application Priority Data
Jan. 27, 2012 (WO) ................ PCT/CN2012/070722

(51) Int. Cl.
*H04J 3/06* (2006.01)
*H04W 56/00* (2009.01)
*H04L 5/00* (2006.01)
*H04J 1/06* (2006.01)

(52) U.S. Cl.
CPC ............ *H04W 56/0015* (2013.01); *H04J 1/06* (2013.01); *H04J 3/0617* (2013.01); *H04L 5/0035* (2013.01); *H04W 56/0035* (2013.01)

(58) Field of Classification Search
None
See application file for complete search history.

(56) References Cited

U.S. PATENT DOCUMENTS 6,483,885 B1 * 11/2002 Bradley ................ H04J 3/0608
375/366
2004/0052228 A1 3/2004 Tellado et al.
(Continued)

FOREIGN PATENT DOCUMENTS

CN 101098218 1/2008
CN 102144423 8/2011
(Continued)

OTHER PUBLICATIONS

PCT International Search Report for International Application No. PCT/CN2012/078677, Nov. 1, 2012.
3rd Generation Partnership Project; Technical Specification Group Radio Access Network; Evolved Universal Terrestrial Radio Access (E-UTRA); Physical layer procedures (Release 8), 2009.
EPO Communication pursuant to Rule 164(1) EPC for Application No./U.S. Pat. No. 12866730.0-1855 / 2807874 PCT/CN2012078677, Jul. 17, 2015.
(Continued)

*Primary Examiner* — Ayaz Sheikh
*Assistant Examiner* — Tarell Hampton
(74) *Attorney, Agent, or Firm* — Baker Botts, LLP (57) ABSTRACT

Techniques are disclosed for synchronizing frequency among a cluster of coordinated transmission points cooperating in a coherent joint transmission. In some embodiments, one transmission point is set (510) as a reference transmission point for a group of coordinated transmission points. Each of one or more other transmission points in the group receives (530) a specified downlink reference signal from the reference transmission point, measures (540) its frequency offset relative to the reference point, and compensates (550) the frequency offset in baseband processing or by a radio adjustment. Which transmission point acts as the reference transmission point is statically defined, in some embodiments, or dynamically configured, in others. Likewise, which time-frequency resources are used for the reference signal may be statically defined or dynamically configured. In some embodiments, information identifying the reference transmission point and/or specifying the radio resource locations and durations of the reference signal is distributed to the synchronizing transmission points.

15 Claims, 4 Drawing Sheets

(56) References Cited

U.S. PATENT DOCUMENTS

| | | | |
|---|---|---|---|
| 2004/0095909 A1* | 5/2004 | He | H04L 27/3809 370/337 |
| 2007/0021121 A1 | 1/2007 | Lane et al. | |
| 2008/0281938 A1* | 11/2008 | Rai | G06F 15/177 709/209 |
| 2010/0027456 A1* | 2/2010 | Onggosanusi | H04B 7/024 370/312 |
| 2011/0111779 A1* | 5/2011 | Krishnamurthy | H04L 5/0053 455/501 |
| 2011/0170527 A1* | 7/2011 | Yamamoto | H04W 56/0015 370/338 |
| 2011/0176483 A1* | 7/2011 | Palanki | H04W 56/0015 370/328 |
| 2011/0275397 A1* | 11/2011 | Guey | H04W 16/12 455/509 |
| 2011/0281574 A1* | 11/2011 | Patel | H04W 56/0015 455/422.1 |
| 2012/0182909 A1* | 7/2012 | Yamamoto | H04W 56/002 370/281 |
| 2013/0114524 A1* | 5/2013 | Sirotkin | H04L 1/0026 370/329 |
| 2014/0369286 A1* | 12/2014 | Noh | H04W 72/1289 370/329 |

FOREIGN PATENT DOCUMENTS

| | | |
|---|---|---|
| EP | 2 299 761 A1 | 3/2011 |
| WO | WO 2010/027587 | 3/2010 |

OTHER PUBLICATIONS

3GPP TSG RAN WG4 Meeting #52, Shenzhen, China, Title: "Support for time and frequency synchronization using network listening", Source: TSG-RAN WG4, Release: 3GPP Release 9, R4-093144, Aug. 24-28, 2009.

3GPP TSG RAN WG4 Meeting #52bis, Miyazaki, Japan, Title: "Text Proposal for TDD HeNB synchronization with macro layer eNB", Source: Nokia Siemens Networks, Nokia, Agenda 7.7, R4-093645, Oct. 12-16, 2009.

3GPP TSG RAN WG2 Meeting #67bis, Miyazaki, Japan, Title: "Support for time and frequency synchronization using network listening", Source: TSG-RAN WG4, Release: 3GPP Release 9, R2-095423, Oct. 12-16, 2009.

3GPP TSG-RAN WG2 #67-BIS, Miyazaki, Japan, Title: "Signalling Mechanisms for Synchronization Bits", Source: Qualcomm Europe, Agenda 6.8, R2-095999, Oct. 12-16, 2009.

3GPP TSG-RAN WG4 Ad Hoc #1, Sophia Antipolis, France, Title: "Text Proposal for TR 36.922: TDD HeNB Synchronization using Network Listening", Source: Nokia Siemens Networks, Nokia, Qualcomm Incorporated, CMCC, Agenda Item 2.2.3, TDD Home eNodeB RF Requirements, R4-10XXXX, Jan. 18-22, 2010.

3GPP TSG RAN WG3#66bis, Valencia, Spain, Title: "Synchronization solution for TDD HeNB", Source: ZTE, Agenda 14, R3-100176, Jan. 18-22, 2010.

European Patent Office Communication and Supplementary European Search Report in Application No. 12866730.0-1855/2807874 PCT/CN2012078677, Sep. 11, 2015.

* cited by examiner

FREQUENCY SYNCHRONIZATION METHOD FOR NODES IN A DOWNLINK COORDINATED MULTIPLE POINT TRANSMISSION SCENARIO

PRIORITY

This nonprovisional application is a U.S. National Stage Filing under 35 U.S.C. §371 of International Patent Application Serial No. PCT/CN2012/078677, filed Jul. 16, 2012 and entitled "A Frequency Synchronization Method for Nodes in A Downlink Coordinated Multiple Point Transmission Scenario," which claims the priority benefit of International Patent Application Serial No. PCT/CN2012/070722, filed Jan. 27, 2012 and entitled "A Frequency Synchronization Method for Nodes in A Downlink Coordinated Multiple Point Transmission Scenario."

TECHNICAL FIELD

The present invention relates generally to coordinated transmissions of radio signals from multiple transmitting nodes and more particularly relates to techniques for synchronizing carrier frequencies among multiple coordinated transmitter nodes.

BACKGROUND

The 3$^{rd}$-Generation Partnership Project (3GPP) is developing standards for several Coordinated Multipoint (CoMP) techniques, including a CoMP mode for downlink transmissions known as "coherent joint transmission". According to this technique, multiple transmission points simultaneously transmit signals carrying the same information streams to a single mobile terminal ("user equipment" or "UE" in 3GPP terminology), where each transmission point is using the same time-frequency resources. The signals from the different points are intended to be combined constructively at the air interface level (i.e., prior to any demodulation or detection). The UE is unaware of this joint transmission, and does not need to take special action when demodulating the data blocks that are cooperatively transmitted by multiple points.

In order to maximize the combining gain from coherent multipoint transmission, the signals from the different points should reach the UE at almost exactly the same time. For example, in the context of a Long-Term Evolution system, which uses Orthogonal Frequency Division Multiplexing (OFDM) for downlink transmissions, differences in arrival time at the UE should be smaller than the cyclic prefix length of an OFDM symbol.

Furthermore, the carrier frequencies used by the different transmission points should be exactly the same or within a rigorous difference range, so that such a difference will not impair the constructive combining gain at UE. Likewise, the phase of the signals from the different points should be aligned in a manner such that the signals from different points are additively combined.

Figure 1:
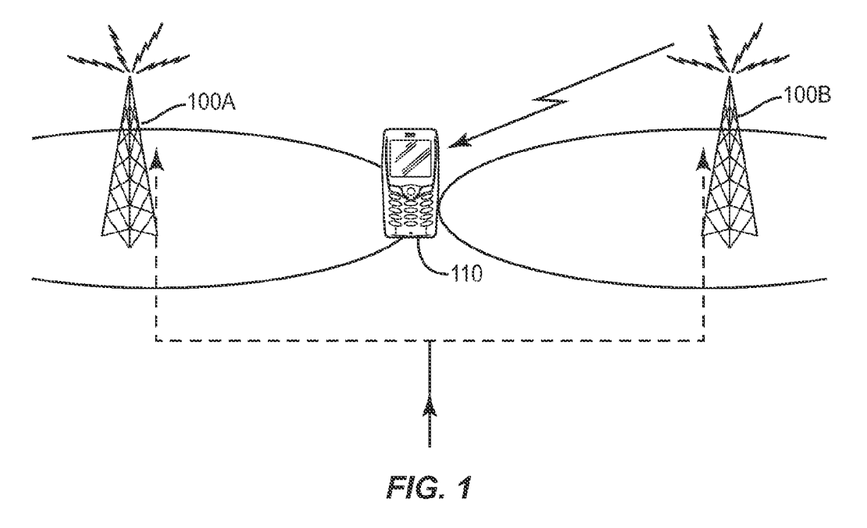
FIG. 1 is an illustration of a CoMP transmission scenario.

FIG. 1 illustrates a simple example of CoMP transmission, where two transmission points 100*a* and 100*b* transmit nearly identical signals to UE 110. Because the transmission delays between the UE and each of the transmission points is not necessarily identical, coordination is needed to ensure that the time-of-arrival (relative to a given sequence of symbols) is the same, or very nearly the same, for the two signals. If so, and if the carrier frequencies are tightly synchronized, the signals will add constructively in the radio front-end of UE 110, yielding a better quality received signal than would have been received if only one of the two transmission points was transmitting the signal.

Figure 2:
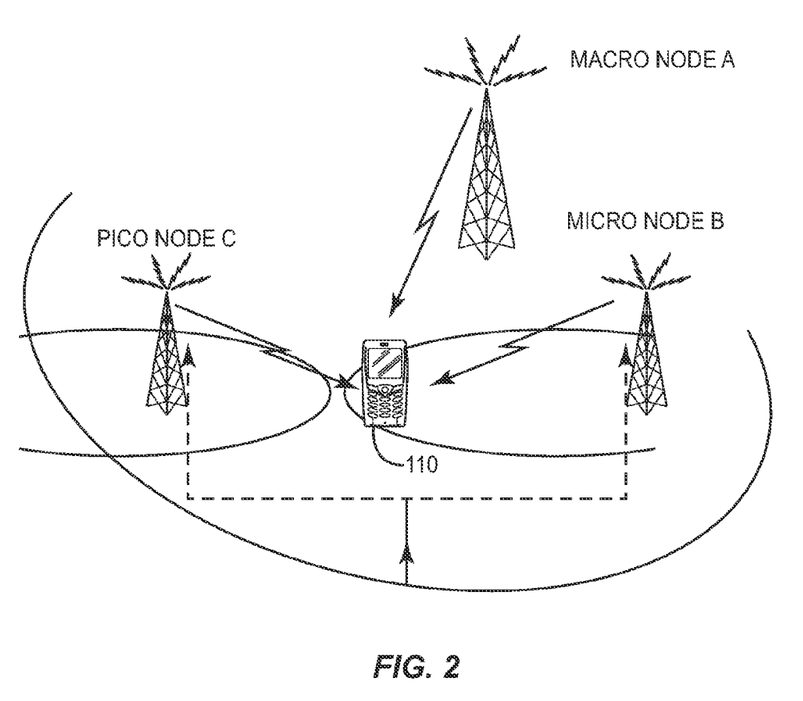
FIG. 2 illustrates another CoMP transmission scenario, in a heterogeneous network.

There are a variety of possible network deployments for CoMP in general and coherent joint transmission in particular. These include scenarios that involve a macro-cell scenario, such as the remote deployment of macro base stations, and heterogeneous network scenarios, sometimes referred to as "HetNet." A HetNet can be constructed using various combinations of different types of nodes, for instance, the macro/micro/pico nodes, relay/repeater nodes, etc. FIG. 2 illustrates a coherent joint transmission for a simple example of a HetNet deployment. In FIG. 2, macro node A, micro node B, and pico node C transmit nearly identical signals to UE 110. Again, the transmissions are coordinated so that the signals arrive at UE 110 at very nearly the same time.

Another scenario in which signal timing and frequency synchronization can be important is in the context of a system that uses a distributed antenna system (DAS). In this system, a radio base station "owns" (i.e., controls) one or more remote radio units (RRUs). Each RRU has its own oscillator to generate the radio frequency carrier signal. In the DAS system, frequency synchronization between RRUs is very important in order to achieve gains from coherent joint transmission, just as it is in the HetNet or other multiple transmission point scenario. Accordingly, cost-effective techniques for ensuring frequency synchronization between coordinating transmission points are needed.

SUMMARY

To meet the required frequency synchronization accuracy for a coherent joint transmission, it may be very costly or completely prohibitive to rely only on a factory-based or calibration-based consistency among radio sources distributed in different RRUs, without the use of some adaptive frequency-adjustment method. Hence, improved methods are needed for synchronizing frequency among a group of RRUs or base stations ("eNodeBs" or "eNBs," in LTE terminology). The present invention, in several of its embodiments, meets this need. Thus, the following description includes methods and apparatus for synchronizing carrier frequencies among a group of coordinating transmission points. In particular, these methods and apparatus may be used to meet the tight requirements for frequency synchronism among a cluster of coordinated transmission points cooperating in a coherent joint transmission.

In some embodiments of the present invention, one transmission point (e.g., an eNB/Access point) is set as a reference transmission point for a group of coordinated transmission points. (A group of coordinated transmission points is referred to hereinafter as a "CoMP cluster.) Each of one or more other transmission points in the cluster receives a specified downlink reference signal (RS) from the reference transmission point, measures its frequency offset relative to the reference point, and compensates the frequency offset in baseband processing or by a radio frequency adjustment.

Which transmission point acts as the reference transmission point may be statically defined, in some embodiments, or dynamically configured, in others. Likewise, which time-frequency resources are used for the reference signal may be statically defined or dynamically configured. Accordingly, in some embodiments, information identifying the reference transmission point and/or specifying the radio resource locations and durations of the reference signal is distributed to the synchronizing transmission points. This information may be distributed by a synchronization coordinator node, which may be the same as or separate from the reference node.

In some of these embodiments, each of the transmission points uses a time-division duplex (TDD) transmission mode, and the reference transmission point uses a different subframe configuration than other points in the CoMP cluster, for at least one subframe. The reference transmission point transmits the reference signal in at least a portion of this subframe, and the one or more other transmission points in the cluster receive the reference signal in that at least one portion. In an LTE TDD system, for example, the reference transmission point may be configured to use the "special sub-frame," as specified by LTE standards, for transmitting the reference signals. The reference transmission point in these cases might use special subframe configuration 4, for example, while one or more of the other transmission points in the cluster are set to use special subframe configuration 0, for example. These special subframe configurations establish different lengths of DwPTS, GP, and UpPTS, which are the downlink, guard period, and uplink portions of the subframe, respectively. Thus, by using different special subframe configurations for the reference transmission point and the one or more other transmission points in the cluster, the points to be synchronized are able to receive a reference signal sent in the special sub-frame by the reference transmission point. In some embodiments, the common reference signal (CRS) is used for this purpose, although other reference signal designs may be used instead, including reference signals especially designed for this purpose.

One advantage of several embodiments of the present invention is that the solution is completely compatible with the current standards for 3GPP LTE. It should be noted that the synchronization procedure summarized above can generally be repeated, to maintain synchronization, but a relatively long repetition period may be used, due to the slow drifting of the frequency sources. As a result, this solution will not influence downlink transmission procedures to any considerable extent.

In some embodiments a completely new reference signal (i.e., other than CRS) can be designed and used for frequency synchronization purposes. Further, the reference signal can be transmitted during any downlink and uplink switch time, i.e, in a guard time, and is not just limited to a special subframe in the LTE TDD, nor is the technique limited to an LTE TDD context at all.

Indeed, embodiments of the invention are applicable for a wide range of scenarios, including frequency-division-duplex (FDD) systems. For a downlink CoMP system of LTE FDD mode, for example, a reference transmission point can be predefined or dynamically specified for a CoMP cluster, and other points in the CoMP cluster can measure the reference signal from the reference point in judiciously set idle sub-frames. In FDD systems the transmit and receive frequencies for a base station or other transmission point are different; thus, the frequency offset measurement can be done with either an additional receiving unit or a using a receiver unit shared with an antenna calibration unit, for example.

In addition to the methods summarized above, base station/transmission point apparatus adapted to carry out any of these techniques are also disclosed herein. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

For illustrative purposes, several embodiments of the present invention will be described in the context of a Long-Term Evolution (LTE) system. Those skilled in the art will appreciate, however, that several embodiments of the present invention may be more generally applicable to other wireless communication systems, including, for example, WiMax (IEEE 802.16) systems.

One example of a heterogeneous wireless node deployment is illustrated in FIG. 2. Nodes A, B and C are distributed transmission points (sometimes referred to as "access nodes" or "access points"), which can be coordinated to perform CoMP downlink technologies with respect to mobile terminal 110. In the discussion that follows, any of the terms "node," "transmission point," "base station," "eNB," and the like may be used to refer to a coordinating transmission point, although it will be appreciated that these terms are not completely synonymous. Unless the context indicates otherwise, the terms "coordinating node" or "reference node" or "synchronizing node" as used in the following discussion refer to a combination of control circuitry and radio circuitry associated with an antenna or group of antennas configured to transmit and receive signals from a given geographic location. The control circuitry and radio circuitry need not be in a single unit or in a single geographic location, and a single control unit may include control circuitry configured to control multiple transmission points, in some cases.

As noted above, proper carrier frequency alignment between a group or "cluster" of different transmission points like those pictured in FIG. 2 is a critical requirement for achieving the expected gains from some forms of CoMP transmission, including joint transmission. However, because different transmission points have different oscillators, there are frequency synchronization errors and time-varying "floating" of frequencies between different transmission points. This problem can arise in a system utilizing Remote Radio Units (RRUs) as well as in heterogeneous networks and networks utilizing coordination between multiple macro base stations.

These frequency synchronization errors between potentially coordinating nodes arise for several reasons. For instance, temperature variations will create frequency differences between multiple oscillators, even if the oscillators are initially calibrated against one another. Moreover, the electrical characteristics of the same type of oscillators can also be slightly different; thus, for example, frequency errors can arise even where identical supply voltages and control voltages are used. Frequency misalignments, if severe enough, can result in destructive combination of the signals from different points.

In short, to meet the required frequency synchronization accuracy for a coherent joint transmission, it may be very costly or completely prohibitive to rely only on a factory-based or calibration-based consistency among radio sources distributed in different RRUs or among separate base stations, without the use of some adaptive frequency-adjustment method. In fact, mismatch of the carrier frequency among different nodes does exist in real systems. Hence, improved methods are needed for synchronizing frequency among a group of RRUs or base stations ("eNodeBs" or "eNBs," in LTE terminology). The present invention, in several of its embodiments, meets this need. Thus, the following description includes methods and apparatus for synchronizing carrier frequencies among a group of transmission points. In particular, these methods and apparatus may be used to meet the tight requirements for frequency synchronism among a cluster of coordinated transmission points transmission points used for coherent joint transmission.

According to several embodiments of the present invention, the carrier frequencies of several coordinating nodes are synchronized by the following general procedure. First, one eNB node/transmission point is configured or predetermined as a reference transmission point and transmits a reference signal. Each of one or more other eNB nodes/transmission points within the CoMP cluster receives the reference signal from the reference point, measures its frequency offset from the reference signal, i.e., frequency "mismatch," and then compensates its carrier frequency, based on the measured frequency offset. The compensation may be performed at baseband, or in the radio-frequency portion of an RRU, for example.

For a TDD-LTE system, the solution is exemplified as follows. For purposes of illustration, assume that Node A, as pictured in FIG. 2, is chosen as a reference node. The remaining nodes (node B and node C) will synchronize their frequencies with node A's frequency and are thus "synchronizing nodes." Note that while this example assigns the reference node role to node A, the macro node, any of the nodes could act in this role in another scenario.

In this illustrative example, the reference node (node A) transmits a downlink RS signal in a special sub-frame, specifically in a DwPTS time duration of the special subframe. In some embodiments, this special sub-frame configuration is set as special subframe configuration 4, as standardized in LTE specifications. As detailed in those specifications, the lengths of DwPTS, GP and UpPTS can take one of 9 combinations of values, termed special subframe configurations 0 through 8. The LTE standard specifies the lengths in terms of the fundamental period of the OFDM modulation, but the lengths can be interpreted in terms of OFDM symbols as shown in Table 1.

allocated to downlink symbols and uplink symbols, respectively. The remaining 3 symbols in the subframe are the GP (guard period), which is situated between the DwPTS and UpPTS intervals. In effect, the special subframe is both a downlink subframe and an uplink subframe, with some restriction placed on the number of OFDM symbols that are occupied in each case.

Figure 3:
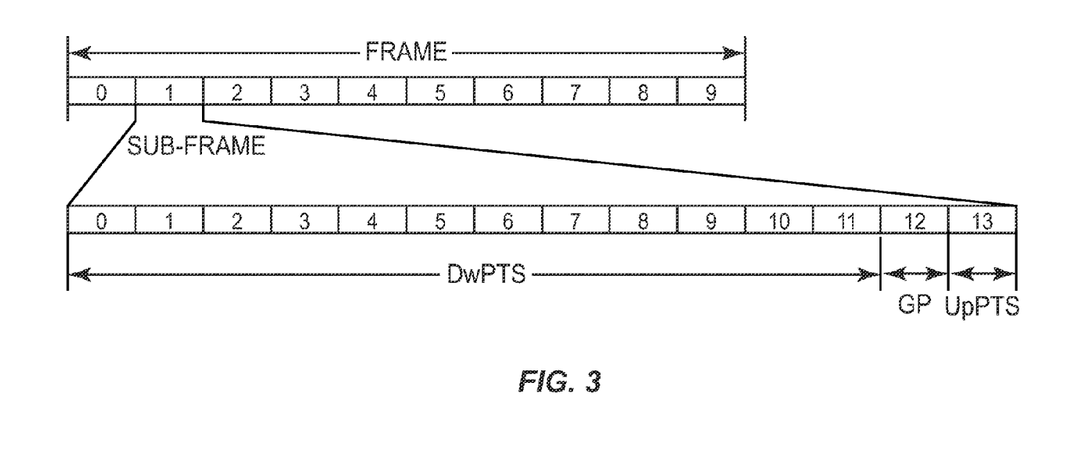
FIG. 3 illustrates an example special subframe structure for a reference transmission point.

The structure of the special sub-frame (for special subframe configuration 4) is illustrated in FIG. 3, for the case where a normal cyclic prefix is used. This broadcasting transmission is activated and carried out by reference node whenever a synchronization action is necessary. Note that other special sub-frame configurations can also be used if there are enough available reference signals in the corresponding configuration.

Referring to FIG. 3, it can be seen that for the signal from the reference transmission point, OFDM symbols 1 to 11 (DwPTS) in the special sub-frame time-slot are downlink symbols while OFDM symbol 13th is an uplink symbol, and OFDM symbol 12 is a guard period for switching from downlink to uplink.

Figure 4:
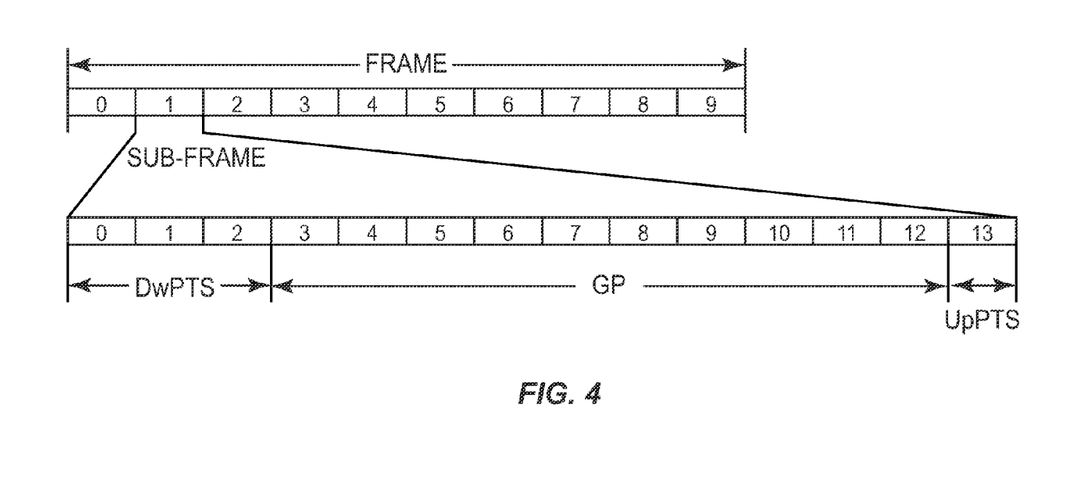
FIG. 4 illustrates an example special subframe structure for a synchronizing transmission point.

For a synchronizing node, such as nodes B and C, in FIG. 2, the special sub-frame can be configured so as to complement the special subframe structure used to carry the reference symbols. One example is depicted in FIG. 4, which illustrates special subframe configuration 0. Here, OFDM symbols 0 to 2 are downlink symbols (DwPTS), symbol 13 is an uplink symbol (UpPTS), and symbols 3 to 12 are a guard period. Because no signal is being transmitted by nodes B and C during this guard period, nodes B and C can receive the OFDM symbols 3 to 11 broadcasted from the reference node, i.e. node A, once node-to-node synchronization is initiated.

Further note that existing LTE standards already specify that OFDM symbols 4, 7 and 11 carry the downlink cell-specific, or "common," reference signal (CRS). Thus, in some embodiments of the invention, nodes B and C measure their frequency offsets relative to the frequency of the signals transmitted by node A, by processing the received signals at OFDM symbols 4, 7 and 11. Of course, the configuration in FIG. 4 is just one example. The GP can be reduced according to the network. In this case, there may be fewer OFDM symbols that are used for synchronization. After the frequency offsets are estimated, i.e., measured, the carrier frequencies of nodes B and

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 3 | 1 | 1 | 3 | 1 | 1 |
| 1 | 9 | | | 8 | | |
| 2 | 10 | | | 9 | | |
| 3 | 11 | | | 10 | | |
| 4 | 12 | | | 3 | 2 | 2 |
| 5 | 3 | 2 | 2 | 8 | | |
| 6 | 9 | | | 9 | | |
| 7 | 10 | | | — | — | — |
| 8 | 11 | | | — | — | — |

For instance, given a normal cyclic prefix in both the uplink and downlink, special subframe configuration 6 has a DwPTS length of 9 symbols, and a UpPTS length of 2 symbols, where DwPTS and UpPTS are the portions of the special subframe C can be compensated with the estimated frequency shifts respectively, e.g., by adjusting their respective oscillators and/or signal processing to account for the frequency offsets relative to node A. Of course, many techniques for adjusting local oscillator frequencies or compensating for frequency offsets in digital signal processing algorithms are known. In such a manner, the signals transmitted to the mobile terminal from nodes A, B and C will all be synchronized in carrier frequency, to the necessary accuracy.

For regular signal frames, i.e., signal frames not used for frequency synchronization purposes, the special sub-frame of the nodes A, B and C will usually have the same structure. In some embodiments of the present invention, whenever the frequency synchronization procedure starts, the above mentioned special sub-frames are set accordingly for the reference nodes and synchronizing nodes. In order to do so, information exchange may be necessary among the nodes. This information exchange may be based on a proprietary implementation, in some embodiments. In other embodiments this information exchange may be standardized, e.g., using a newly standardized procedure over the existing X2 interface between LTE eNBs. If the nodes A, B and C are centrally controlled, for example, a proprietary method could be implemented. However, if there is only an X2-like connection between eNBs, standardization for the procedure and signaling specification is likely to be necessary.

Following are details of a general procedure according to some embodiments of the invention. Generally speaking, the technique is applicable to both TDD and FDD cases, although some of the details discussed are specific to LTE TDD. This procedure is pictured in the process flow diagram of FIG. 5.

Figure 5:
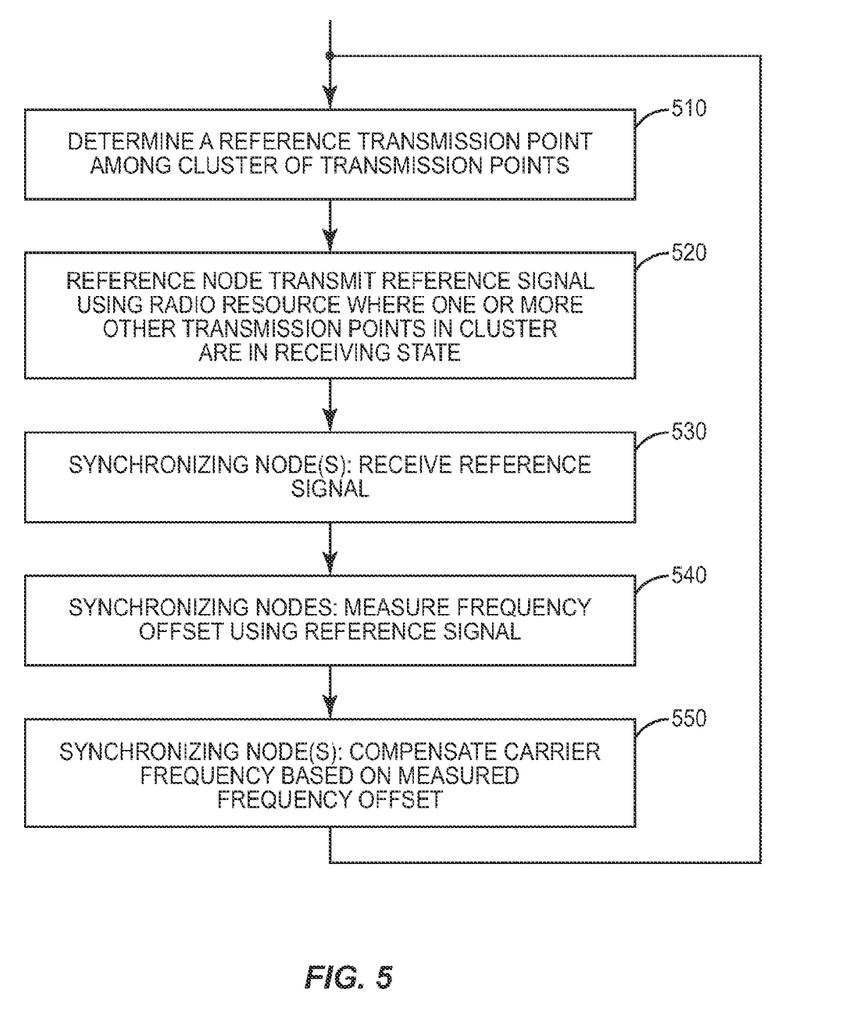
FIG. 5 is a process flow diagram illustrating an example method for synchronizing frequencies among transmission points in a coordinated cluster of transmission points.

First, as shown at block 510 in FIG. 5, a reference node among the CoMP cluster is determined. This is dynamically selected, in some embodiments, in which case the reference node selection shown at block 510 may be following by the sending of control information to the reference node and/or the synchronizing nodes to identify the reference node. However, in other embodiments, the reference node is predetermined. Thus, the "step" illustrated at block 510 may be viewed as optional.

As shown at block 520, the reference node sends reference signals at the radio resource where the synchronizing nodes are in a receiving status and can capture the reference signals. As discussed in detail earlier, in an LTE TDD system, this may include the reference node and synchronizing nodes separately setting their special sub-frame structure in a manner so that a downlink portion of a subframe for the reference transmission point overlaps a guard period portion of the same subframe for the synchronizing transmission points. Note that in some embodiments, a synchronization coordinator node, which may be the reference node in some cases, distributes control information among the nodes about radio resource locations and durations of reference signals. This control information may identify which specific subframes are to be used to carry reference signals for synchronization purposes, for example, and may further specify a special subframe configuration for the reference node or the synchronizing nodes, or both. As a result, synchronizing nodes and the reference node will enter a synchronization mode at a proper timing.

When the reference node (e.g., node A, in FIG. 2) begins to send the reference signal, the synchronizing nodes (e.g., nodes B and C in FIG. 2) begin to receive this signal from the reference point, as shown at block 530.

As shown at block 540, frequency offset measurements between the reference node and the synchronizing nodes are carried out individually, at each synchronizing node, using the reference signal. Frequency measurement techniques for a variety of signals, including OFDM signals, are well known—thus, the frequency offset measurement between two nodes based on the reference node's reference signal can adopt an existing methodology.

The carrier frequency offset is compensated individually, at each synchronizing node, by using the measured frequency offset determined at that node, as shown at block 550. The carrier frequency can be either compensated in the RF subsystem of the synchronizing node, or in the baseband digital signal processing subsystem, or even in a combination of both.

The procedures detailed above provide a practical and efficient method for synchronizing carrier frequencies among transmission points performing CoMP joint transmission. These techniques can be implemented at baseband, which will not cause any hardware revision, so the cost of implementation is low and updating for continuous improvement is feasible and time-efficient. Revisions to existing standards may be possibly avoided when the baseband subsystem of the eNBs are co-located, which can possibly be implemented before and after product release.

In the proposed method, the period between two consecutive synchronization activations is determined by the stabilities of the local radio frequency sources of the participating nodes. Nevertheless, the required repetition rate in a practical implementation is not likely to be very frequent, so the proposed method will not impair the overall downlink spectrum efficiency for any node in any considerable extent.

Figure 6:
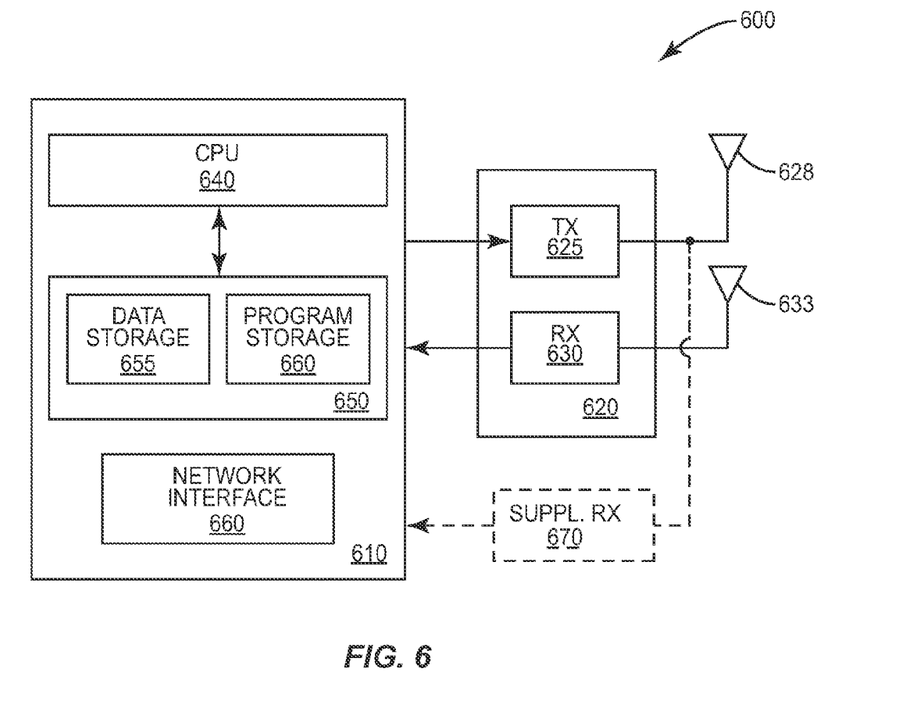
FIG. 6 is a block diagram illustrating components of an example transmission point according to some embodiments of the invention.

FIG. 6 illustrates features of an example transmission point 600 according to several embodiments of the present invention. Although the detailed configuration, as well as features such as physical size, power requirements, etc., may vary, the general characteristics of the elements of transmission point 600 are common to both a point acting as a reference point and a point synchronizing its carrier frequency based on reference signals transmitted by a reference point.

Transmission point 600 comprises a transceiver 620 as well as a processing circuit 610 for processing the signals transmitted and received by the transceiver 620. Transceiver 620 includes at least one transmitter 625 coupled to one or more transmit antennas 628 and at least one receiver 630 coupled to one or more receive antennas 633. The same antenna(s) 628 and 633 may be used for both transmission and reception. In a TDD scenario, transmitter 625 and receiver 630 may be the same transmitter and receiver used for communicating with mobile terminals. In a FDD scenario, the reference transmission point can use the same transmitter 625 for transmitting reference signals that it uses to transmit downlink signals to mobile terminals. A synchronizing transmission point, however, may require a separate receiver 630 for processing reference signals transmitted by the reference transmission point, as these signals will be at a different frequency from signals transmitted by mobile terminals.

Receiver 630 and transmitter 625 use known radio processing and signal processing components and techniques, typically according to a particular telecommunications standard such as the 3GPP standards for LTE and/or LTE-Advanced. Because the various details and engineering tradeoffs associated with the design and implementation of such circuitry are well known and are unnecessary to a full understanding of the invention, additional details are not shown here.

Processing circuit 610 comprises one or more processors 640, hardware, firmware or a combination thereof, coupled to one or more memory devices 650 that make up a data storage memory 655 and a program storage memory 660. Memory 650 may comprise one or several types of memory such as read-only memory (ROM), random-access memory, cache memory, flash memory devices, optical storage devices, etc. Again, because the various details and engineering tradeoffs associated with the design of baseband processing circuitry for mobile devices and wireless base stations are well known and are unnecessary to a full understanding of the invention, additional details are not shown here.

Typical functions of the processing circuit 610 include modulation and coding of transmitted signals and the demodulation and decoding of received signals. In several embodiments of the present invention, processing circuit 610 is adapted, using suitable program code stored in program storage memory 660, for example, to carry out one of the techniques described above for transmitting reference signals for synchronization purposes or for receiving said signals and synchronizing a frequency source. Of course, it will be appreciated that not all of the steps of these techniques are necessarily performed in a single microprocessor or even in a single module.

Figure 7:
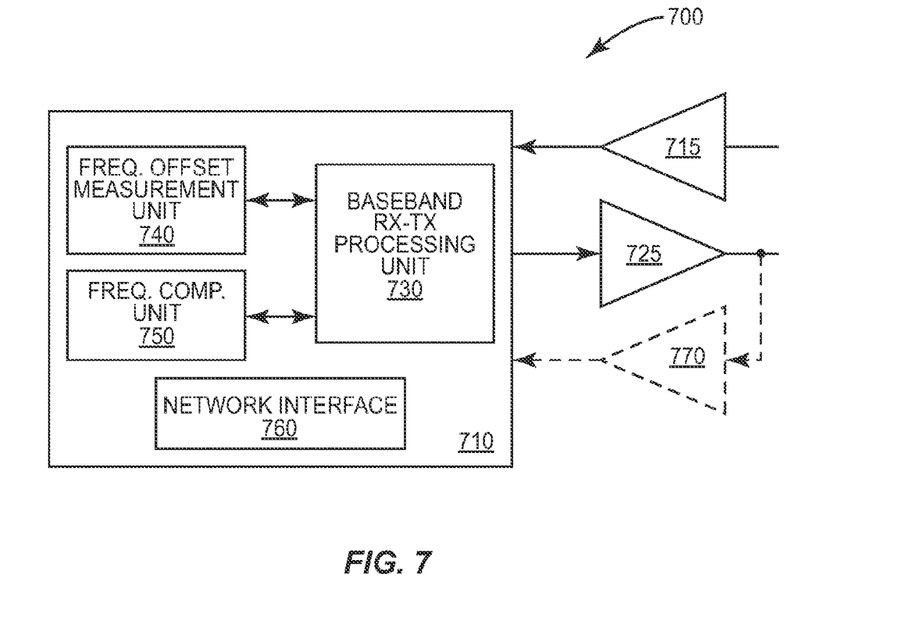
FIG. 7 illustrates functional components of an example synchronizing transmission point.

FIG. 7 illustrates several functional elements of a synchronizing transmission point 700, adapted to carry out some of the techniques discussed in detail above. Transmission point 700 includes a processing circuit 710 configured to receive a reference signal from a reference transmission point, via receiver circuit 715, and to synchronize a carrier frequency for the transmission point 710 based on the reference signal. In several embodiments, processing circuit 710, which may be constructed in the manner described for the processing circuits 610 of FIG. 6, includes a baseband Rx-TX processing unit 730, which is adapted to receive a reference signal transmitted by a reference transmission point. This may include, for example, extracting the reference signal from a pre-determined or dynamically configured portion of a particular subframe, such as a particular special subframe in an LTE context. Processing circuit 710 further includes a frequency offset measurement unit 740, which is adapted to measure a frequency offset between the received reference signal and a local frequency reference (not shown). Processing circuit 710 still further includes a frequency compensation unit 750, which is adapted to compensate the carrier frequency of transmission point 700, based on the measured frequency offset. This may be done, for example, by adjusting transmitted signals at baseband, e.g., by making adjustments to baseband Rx-TX processing unit 730. Alternatively, adjustments can be made at the radio-frequency level, e.g., by making adjustments to transmitter circuit 725. Still further, this compensation may be performed by making adjustments to a reference oscillator (not shown). Of course, all of the variants of the techniques described above are equally applicable to mobile terminal 700 as well.

It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

What is claimed is:

1. A method, in a synchronizing transmission point among a cluster of coordinated transmission points in a wireless network, the cluster including a reference transmission point and one or more synchronizing transmission points, for synchronizing a carrier frequency for the synchronizing transmission point with a carrier frequency for the reference transmission point, characterized in that the method comprises:
   receiving a reference signal transmitted by the reference transmission point, wherein said reference signal is received while the synchronizing transmission point is in a receiving state, the reference signal being received in a special subframe in an LTE communication system operating in time-division duplex mode so that a guard period for the special subframe overlaps a downlink transmission period for a corresponding special subframe transmitted by the reference transmission point;
   measuring a frequency offset between the reference transmission point and a frequency source for the synchronizing transmission point, based on the received reference signal; and
   compensating the carrier frequency for the synchronizing transmission point, based on the measured frequency offset.

2. The method of claim 1, wherein said compensating is performed at baseband.

3. The method of claim 1, wherein said compensating is performed at radio frequency.

4. The method of claim 1, the method further comprising receiving from the reference transmission point, via a network communication interface, information specifying a subframe carrying the reference signal.

5. The method of claim 1, the method further comprising receiving from a synchronization coordinator node, via a network communication interface, information specifying a subframe carrying the reference signal.

6. The method of claim 1, wherein said special subframe configuration for the special subframe is special subframe configuration 0, and wherein the corresponding special subframe transmitted by the reference transmission point is configured according to special subframe configuration 4.

7. The method of claim 1, wherein said synchronizing transmission point is operating in frequency-division duplexing mode and said receiving of the reference signal is at a receiving frequency that coincides with a transmitting frequency for the synchronizing transmission point.

8. The method of claim 1, the method further comprising receiving, from the reference node or a synchronization control node, information identifying the reference node.

9. A synchronizing transmission point adapted to operate in a cluster of coordinated transmission points in a wireless network, the cluster including a reference transmission point and one or more synchronizing transmission points, characterized in that the synchronizing transmission point comprises:
   a baseband processing unit adapted to receive a reference signal transmitted by a remote reference transmission point, wherein said reference signal is received while the synchronizing transmission point is in a receiving state, the reference signal received in a special subframe in an LTE communication system operating in time-division duplex mode so that a guard period for the special subframe overlaps a downlink transmission period for a corresponding special subframe transmitted by the reference transmission point;

a frequency offset measurement unit adapted to measure a frequency offset between the reference transmission point and a frequency source for the synchronizing transmission point, based on the received reference signal; and a frequency compensation unit adapted to compensate a carrier frequency for the synchronizing transmission point, based on the measured frequency offset.

10. A synchronizing transmission point adapted to operate in a cluster of coordinated transmission points in a wireless network, the cluster including a reference transmission point and one or more synchronizing transmission points, the synchronizing transmission point comprising a receiver circuit and a processing circuit, characterized in that the processing circuit is configured to:

receive a reference signal transmitted by a remote reference transmission point, wherein said reference signal is received while the synchronizing transmission point is in a receiving state, the reference signal being received in a special subframe in an LTE communication system operating in time-division duplex mode so that a guard period for the special subframe overlaps a downlink transmission period for a corresponding special subframe transmitted by the reference transmission point;

measure a frequency offset between the reference transmission point and a frequency source for the synchronizing transmission point, based on the received reference signal; and compensate a carrier frequency for the synchronizing transmission point, based on the measured frequency offset.

11. A method, in a reference transmission point among a cluster of coordinated transmission points in a wireless network, the cluster including the reference transmission point and one or more synchronizing transmission points, for synchronizing a carrier frequency for the one or more synchronizing transmission points with a carrier frequency for the reference transmission point, characterized in that the method comprises:

sending control information to the one or more synchronizing transmission points or to a synchronization coordinator node, the control information specifying radio resource locations and durations of one or more reference signals to be transmitted by the reference transmission point; and transmitting the one or more reference signals according to said control information, and wherein the reference transmission point is operating in time-division-duplexing mode in an LTE communication system, and wherein at least one reference signals is transmitted in a special subframe in such a manner that a downlink portion of the reference signal overlaps a guard period of the same subframe for the synchronizing transmission points.

12. The method of claim 11, the method further comprising first sending information identifying the reference transmission point to the synchronizing transmission points.

13. A reference transmission point adapted to operate in a cluster of coordinated transmission points in a wireless network, the cluster including the reference transmission point and one or more synchronizing transmission points, the reference transmission point comprising a transmitter circuit, a processing circuit, and a network interface circuit characterized in that the processing circuit is adapted to:

send control information to the one or more synchronizing transmission points or to a synchronization coordinator node, via the network interface circuit, the control information specifying radio resource locations and durations of one or more reference signals to be transmitted by the reference transmission point; and controlling the transmitter circuit to transmit the one or more reference signals according to said control information, and wherein the reference transmission point is adapted to operate in time-division-duplexing mode in an LTE communication system, and wherein the processing circuit is adapted to control the transmitter circuit to transmit at least one reference signal in a special sub-frame selected so that a downlink portion of the reference signal can overlap a guard period portion of the same subframe for the synchronizing transmission points.

14. A synchronization coordinator node adapted to operate with a cluster of coordinated transmission points in a wireless network, the cluster including a reference transmission point and one or more synchronizing transmission points, characterized in that the synchronization coordinator node is adapted to:

send control information to the reference transmission point and at least one synchronizing transmission point, the control information specifying radio resource locations and durations of one or more reference signals to be transmitted in a special subframe in an LTE communication system operating in time-division duplex mode so that a guard period for the special subframe overlaps a downlink transmission period for a corresponding special subframe transmitted by the reference transmission point.

15. The synchronization coordinator node of claim 14, wherein the synchronization coordinator node is further adapted to, prior to sending said control information to the reference transmission point and the at least one synchronizing transmission point:

select the reference transmission point from among the coordinated transmission points; and send information identifying the reference transmission point to the reference transmission point and the at least one synchronizing transmission point.

\* \* \* \* \*